United States Patent
Kriener et al.

(10) Patent No.: US 7,587,932 B2
(45) Date of Patent: Sep. 15, 2009

(54) APPARATUS AND METHOD FOR MEASURING VALVE LASH

(75) Inventors: Larry Linn Kriener, Waterloo, IA (US); Thomas Craig Koehn, Cedar Falls, IA (US); James Robert Hinke, Cedar Falls, IA (US); Dale Dean Geerdes, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 113 days.

(21) Appl. No.: 11/838,604

(22) Filed: Aug. 14, 2007

(65) Prior Publication Data
US 2009/0044613 A1  Feb. 19, 2009

(51) Int. Cl.
*G01M 15/04* (2006.01)
(52) U.S. Cl. .................................................. 73/114.79
(58) Field of Classification Search .............. 73/114.77, 73/114.79, 115.01, 116.02, 600, 606, 611; 33/600, 606, 611
See application file for complete search history.

(56) References Cited

U.S. PATENT DOCUMENTS

| | | | | | |
|---|---|---|---|---|---|
| 3,988,925 | A | * | 11/1976 | Seccombe et al. | 73/114.79 |
| 6,205,850 | B1 | * | 3/2001 | Wehrman et al. | 73/114.79 |
| 6,474,283 | B1 | * | 11/2002 | Gidlund | 123/90.45 |
| 6,546,347 | B2 | * | 4/2003 | Batchelor et al. | 702/94 |
| 6,973,905 | B2 | * | 12/2005 | Hathaway et al. | 123/90.45 |
| 2004/0154572 | A1 | * | 8/2004 | Yasuda et al. | 123/90.52 |
| 2005/0098125 | A1 | * | 5/2005 | Hathaway et al. | 123/90.1 |
| 2006/0288973 | A1 | * | 12/2006 | Hathaway | 123/90.43 |

\* cited by examiner

*Primary Examiner*—Eric S McCall

(57) ABSTRACT

A valve lash measurement device is provided for an internal combustion engine having an articulated valve train including a rocker arm having a bore at one end that receives a valve abutting shoe having an uneven surface. A fixed geometry reference surface is attached to a spring loaded base insertable into the bore. A weight connected to an arm and hook with a fulcrum in between is movable along a reference plate to pivot the rocker arm between its extremes of movement. A dial indicator abuts the reference surface and indicates the relative displacement between the extremes of movement and therefore the lash.

13 Claims, 4 Drawing Sheets

APPARATUS AND METHOD FOR MEASURING VALVE LASH

FIELD OF THE INVENTION

The present invention relates to measurement of lash in the valve train of an internal combustion engine.

BACKGROUND OF THE INVENTION

Heavy duty engines, and particularly diesel engines of the reciprocating type having poppet valves, utilize an articulated valve train to actuate such valves. Because of the duty cycle usually experienced by this type of engine, substantial components must be used in the valve train. In addition, such engines may also include a cam actuated fuel injection system to achieve ultra high injection pressures when the engine has a unit injector fuel system. For such engines it is not enough to have a hydraulic lifter system similar to those found in automotive applications.

Consequently the clearance between the articulated joints in the valve train must be set within close tolerances to accommodate thermal expansion when an engine is fully heated up, while at the same time providing adequate lift to open valves fully and to displace fuel injector plungers generating sufficient pressure for a fuel injection system. Many systems have been developed to set the lash, particularly in the case of what is referred to as a rocker arm actuating overhead valves. Such rocker arms usually have a threaded component at one end of the rocker arm to displace a contact surface to achieve the necessary clearance between adjacent components, such as the rocker arm and a pushrod. When an engine is in the field, it is periodically necessary to reset the lash to accommodate expected wear in the valve train of an engine. This is done by hand, which is unsuitable for high volume engine production.

A number of systems have been proposed for automating the valve lash adjustment on a production volume basis. These involve automated devices for turning the threaded elements to the point where they achieve the necessary clearances within production tolerances. With any such system there needs to be a check or verification on a statistical basis that the automated system is, in fact, providing the correct lash adjustment. This is generally done using individual instruments. However, when the valve rocker arm has additional elements to provide adjacent component abutting surfaces, the rocker arm has uneven surfaces that are unsuitable for measuring such lash.

Accordingly, there exists a need in the art for accurately determining the lash of a valve train in such an environment.

SUMMARY OF THE INVENTION

In one form, the invention is an apparatus for measuring the lash in an internal combustion engine articulated valve train having at least one uneven surface adjacent an articulated joint. The apparatus includes a fixed geometry reference surface positionable on the uneven surface. A measuring instrument indicates the displacement of the fixed geometry reference surface and a device moves the articulated valve train between the extreme limits of movement so that the measuring instrument indicates the relative displacement of the reference surface to reflect lash in the valve train.

In another form, the invention is an internal combustion engine articulated valve train having at least two mechanical components meeting at an articulated joint, one of the components having at least one irregular surface. A device incorporating a fixed geometry reference surface is attached to the mechanical component adjacent the irregular surface. A measuring instrument indicates the displacement of the fixed geometry reference surface. A device is provided for moving the mechanical components between their range of movement, the measuring instrument indicating the relative displacement of the reference surface to reflect the lash in the valve train.

In yet another form, the invention is a method of measuring the lash in an articulated valve train of an internal combustion engine, the valve train having at least one uneven surface. The method has the steps of providing a fixed geometry reference surface adjacent the uneven surface where the lash is to be measured and measuring the relative position of the reference surface between the extremes of movement of the articulated valve train.

DETAILED DESCRIPTION OF THE INVENTION

Figure 1:
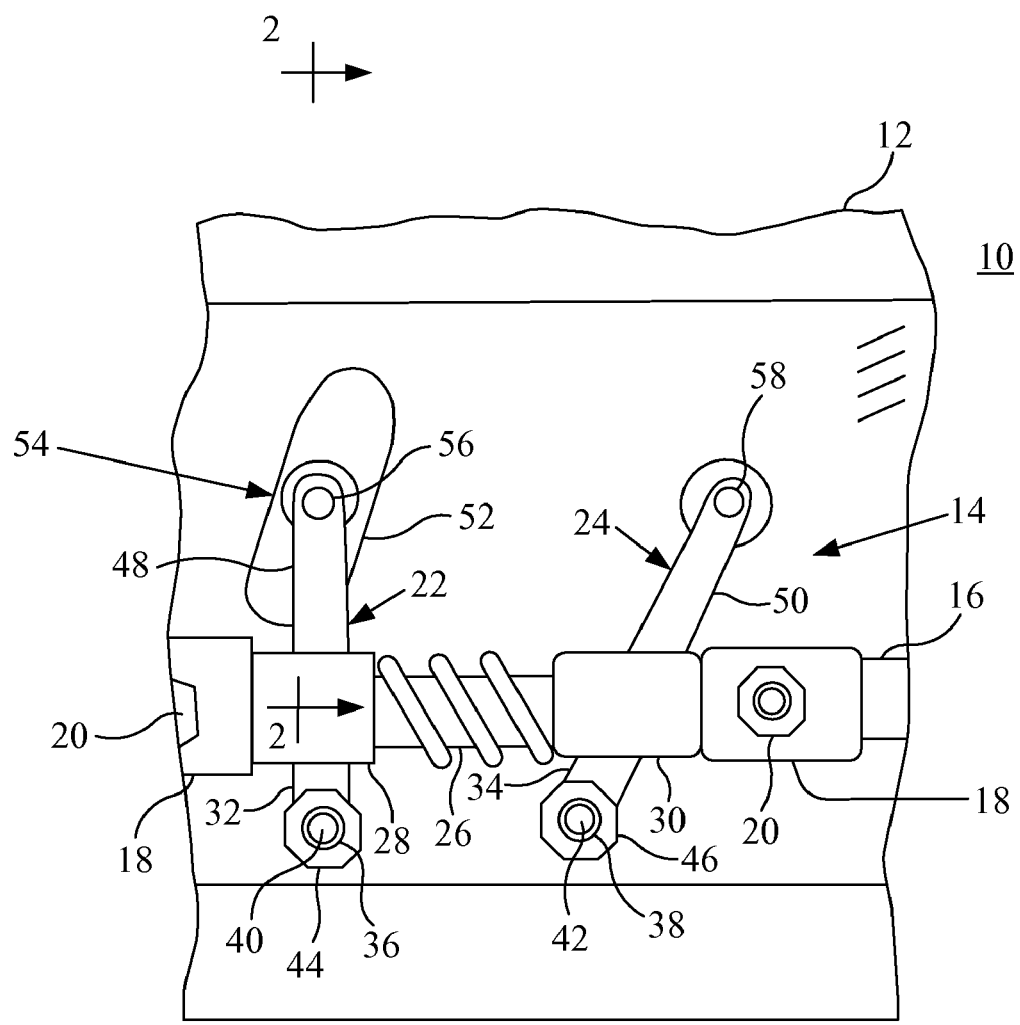
FIG. 1 is a partial plan view of an internal combustion engine with which the present invention is used.

Referring now to FIG. 1, there is shown a plan view of an internal combustion engine 10 having a head 12 and a valve train generally indicated by reference character 14. Only a portion of the valve train 14 and head 12 are shown to simplify the understanding of the present invention. It should be apparent to those skilled in the art that production examples of engine 10 would include multiple cylinders and appropriate mechanisms for those cylinders. The purpose of the valve train 14 is primarily to actuate poppet valves (not shown) from a camshaft (also not shown) to permit intake air for combustion into an engine cylinder and discharge of the products of combustion to permit cylinders within the combustion chamber to reciprocate and convert their linear movement to rotational movement through a crankshaft. The valve train 14 includes a rocker arm shaft 16 generally extending the length of the cylinders to be served. As herein shown, rocker arms for adjacent cylinders are shown. The rocker arm shaft is supported by bases 18 appropriately fixed to the head 12 by screws 20. Rocker arms 22 and 24 are journaled on rocker arm shaft 16 and biased against adjacent supports 18 by a spring 26 acting on the base 28 of rocker arm 22 and base 30 for rocker arm 24. Rocker arms 22 and 24 are usually cast and include a push rod end 32 and 34 positioned to respectively receive an adjustable ball shaped elements 36 and 38 suitably threaded into the pushrod ends 32 and 34 of the rocker arms. Appropriate hexagonal recesses 40 and 42 allow rotation of elements 36 and 38 to adjust the clearance with respect to pushrods (not shown). Appropriate nuts 44 and 46 enable the adjustment to be locked in place.

Rocker arms 22 and 24 each have a valve end portion 48 and 50 extending from bases 28 and 30, respectively. Valve end elements 48 and 50, as herein shown, actuate a valve bridge 52 which in turn actuates multiple valves, also not shown to simplify the understanding of the present invention.

Abutment with the valve bridge 52 is through a slider shoe 54 mounted to the respective valve end portions 48 and 50 by a base press fit into bores 56 and 58, respectively. As shown particularly in FIG. 2, slider foot 54 has a base 66 which is press fitted into bore 56 in rocker arm 22. An annular retainer 60 received over the periphery of base 66, by means of a cross pin 64, captures an annular element 62 that contacts valve bridge 52. The upper surface 68 of base 66 is irregular so that it is difficult to provide an accurate measurement of the movement of the valve end portion 48 of rocker arm 22.

In order to provide a consistent and repeatable measurement of this movement an extension pin, generally indicated by reference character 70, is provided. Extension pin 70 has a base 72 that is removably press fit into bore 56 so that it is in alignment with the inner diameter of bore 56. Bore 56 is accurately machined in manufacture so that the fitting of base 72 into bore 56 gives an accurate and repeatable foundation for extension 70. The base 72 may be spring loaded into bore 56 by a number of means, but shown herein as an axial slot 74 in base 72. The slot 74 provides enough flexibility to insert and remove the bore 74. Base 72 has an integral flange 76 which may be serrated at 78 to permit convenient operator manipulation for example, when the extension pin 70 is inserted or removed. Extension pin 70 has an integral fixed geometry reference surface 80 that is accurately machined relative to the diameter of base 72 to provide a fixed geometry reference surface with which to measure the movement of rocker arm 22. The reference surface 80 is shown as planar, but it can be formed with variations on a planar form to suit individual needs for measurement.

Figure 2:
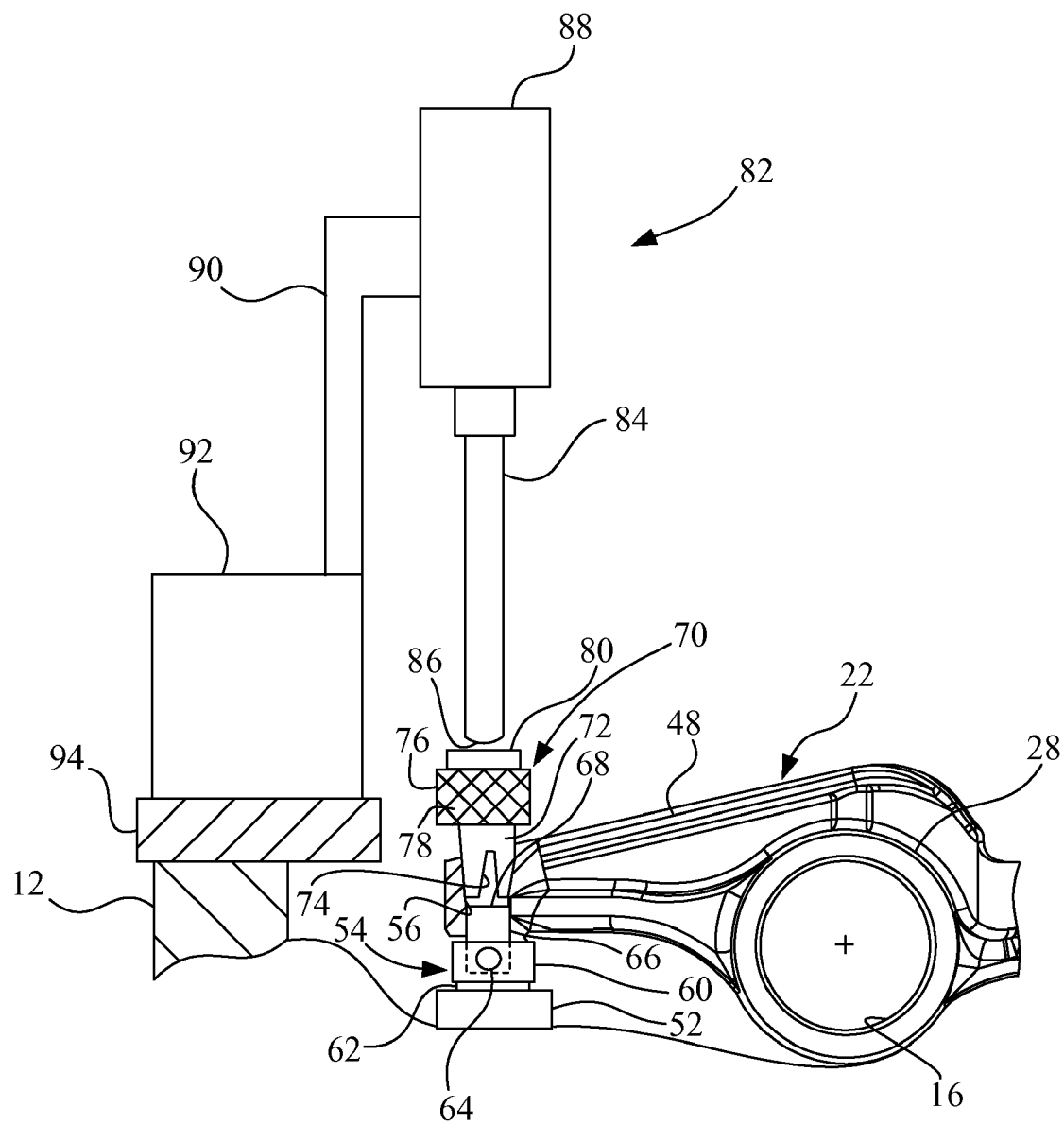
FIG. 2 is an enlarged fragmentary view taken on lines 2-2 of FIG. 1 and adding components of the present invention to the internal combustion engine of FIG. 1.

The movement of reference surface 80, and therefore rocker arm 22, is measured by an appropriate measuring instrument 82, herein shown as a dial indicator. Dial indicator 82 has a displacement probe 84 movable vertically as shown in FIG. 2 and preferably having a slightly convex contact surface 86 to contact the substantially planar reference surface 80 of extension pin 70. The movement of displacement probe 84 is indicated by a indicator face 88 which may have metric or U.S. measurement readout and may be mechanically or electronically actuated. Whichever approach is used, the dial indicator 82 indicates relative movement in millimeters or inches and can be set to zero at a selected position of displacement probe 84.

Dial indicator 82 is fixed to a frame 90 that extends to a base 92. Base 92 permits selective connection to a reference plate 94. Base 92 has a magnetic feature to enable stable and easy connection and ready disconnection. It should be apparent to those skilled in the art that other forms of releasable fastening may be used for connection of base 92 to reference plate 94.

Figure 3:
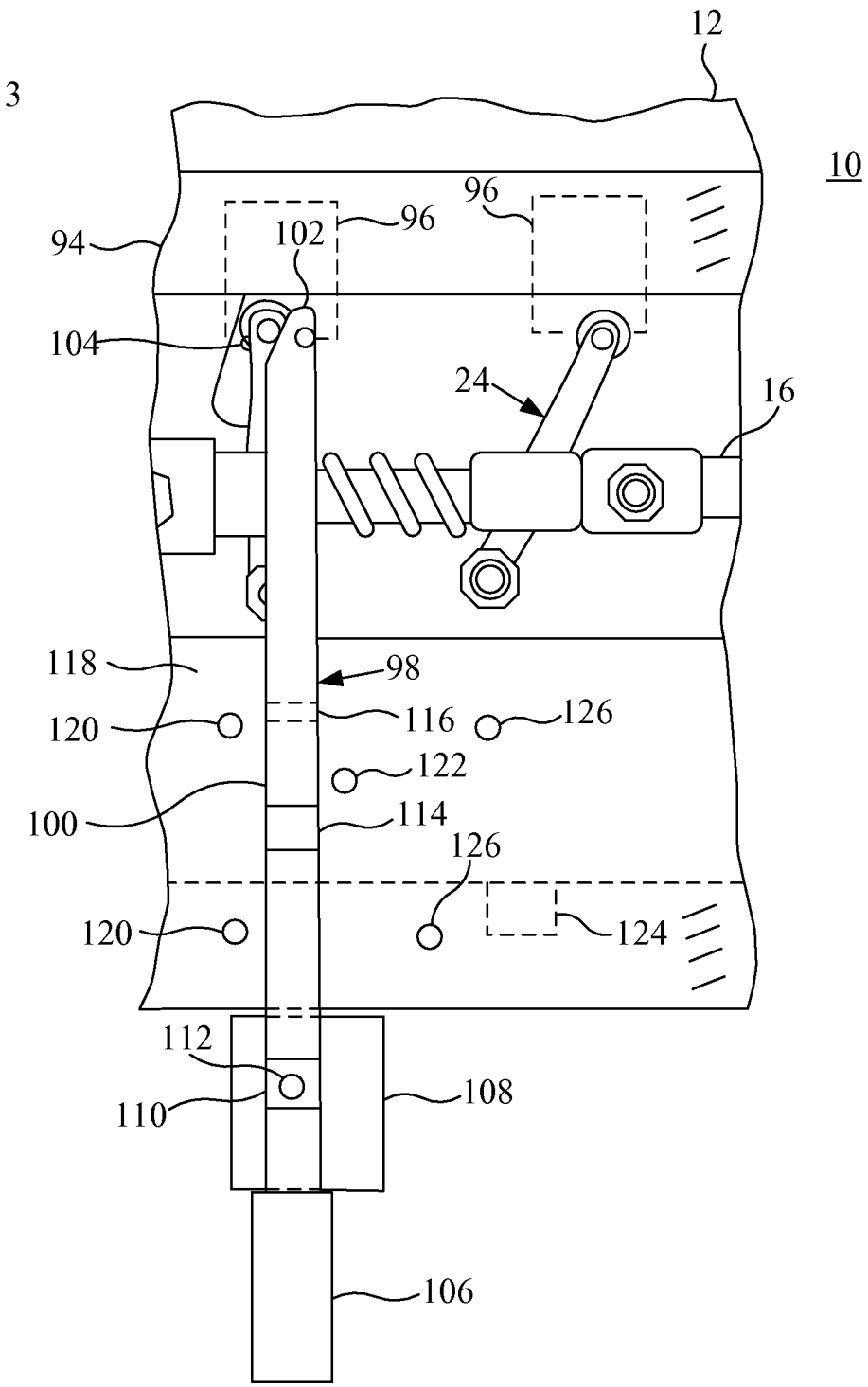
FIG. 3 shows additional components of the present invention in plan view in a first position on the internal combustion engine of FIG. 1.

Referring now to FIG. 3, the reference plate 94 is shown in place on engine head 12 and removably fastened to it by appropriate fasteners, not shown. As shown in FIG. 3, reference surface 94 is elongated so as to permit the positioning of the dial indicator 82, shown by phantom lines 96 in FIG. 3, in any one of a number of positions. The detailed view of dial indicator 82 and its associate mounting is not shown in FIG. 3 to enable a clear understanding of the present invention. The principle of the operation of dial indicator 82 is to measure the extremes of movement of rocker arm 22, or any other rocker arm selected. The range is reflected through movement of reference surface 80 and, from that movement, the lash in the articulated valve train is determined. In order to accurately and repeatedly move the rocker arm 22 between its range of movement, a lever arm assembly 98, generally indicated by reference character 98, is provided. Lever arm assembly 98 has an elongated arm 100 with a remote end 102 receiving a hook 104 that may be positioned underneath rocker arm 22 at an appropriate position. The opposite end of arm 100 has an operator handle 106 and, adjacent thereto, a reference weight or weights 108 affixed to lever 100 through a bracket 110 and appropriate fastener 112. The distance between the reference weights 108 and the hook 104 is a given distance and preferably is twelve inches to enable ready calculation of forces applied. Lever arm 100 has a first fulcrum in the form of a pin 114 and a second fulcrum in the form of a smaller pin 116. The fulcrums 114 and 116 are adapted to rest on a second reference plate 118 which is elongated as with the case of reference plate 94 and permits positioning of the lever arm assembly 98 at any one of a number of positions. A plurality of pins 120 and 122 on plate 118 provide a guide for the pivoting movement of lever arm 98. Reference surface 98 is removably secured to head 12 of engine 10 by appropriate fasteners (not shown) and additional braces in the form of a bracket 124 may be employed to minimize the effect of the weights 108 on reference plate 118. For convenience, reference plates 94 and 118 may be formed as a unitary unit that may be removably attached to the internal combustion engine 10. As noted in FIG. 3, rocker arm 24 is at an angle with respect to rocker arm support 16 and for this purpose the lever arm 98, when used on rocker arm 24, must be at an angle. Additional pins 126 are provided on reference plate 28 to accommodate the angled position. It should also be noted in FIG. 3 that pins 126 cooperate with pins 122 to guide the lever arm when in position on rocker arm 24. In addition, pin 122 cooperates with pins 120 to guide lever arm 98 when it is used on rocker arm 22.

Figure 4:
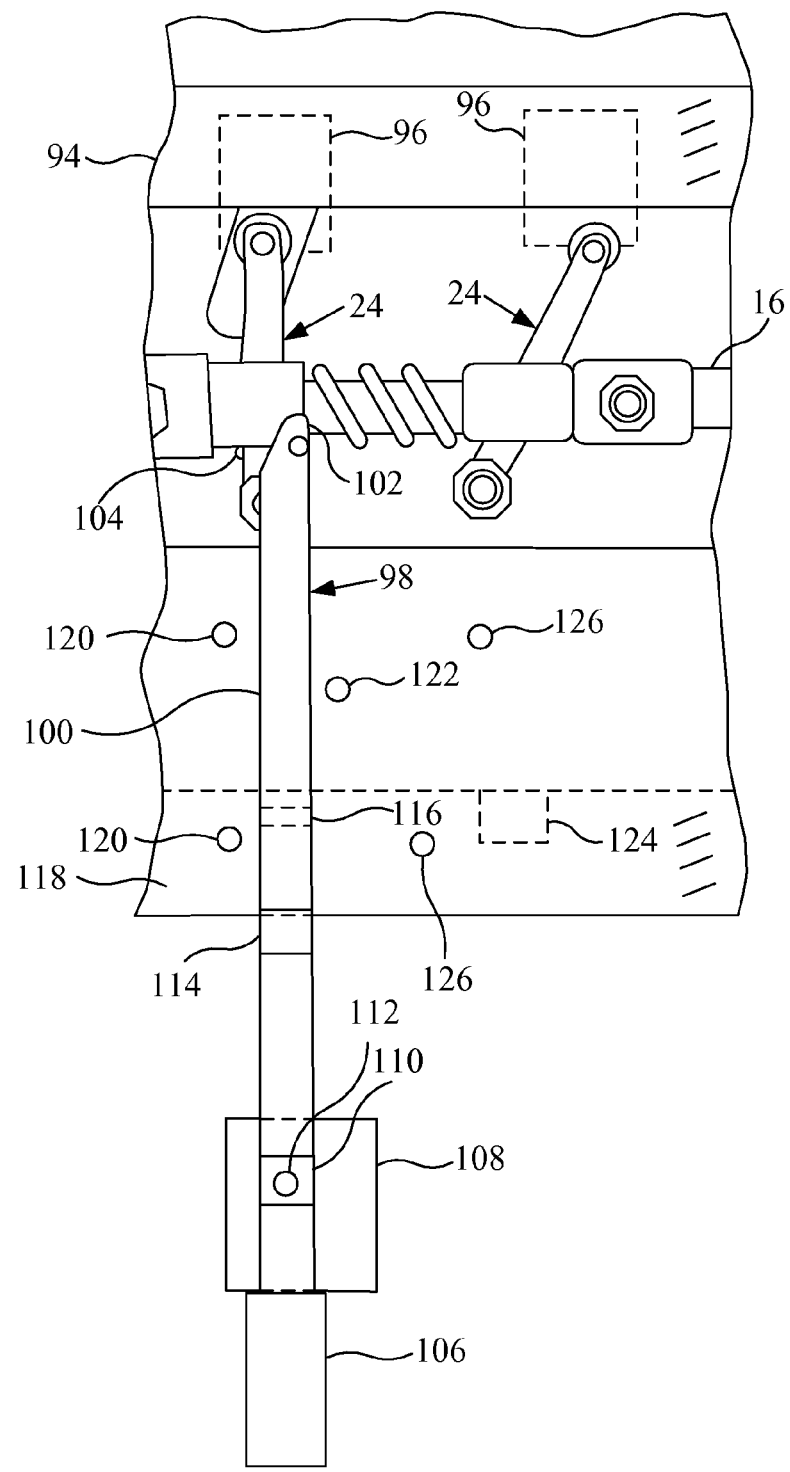
FIG. 4 shows a portion of the components of the invention in a second position on the internal combustion engine of FIG. 1.

In operation, the reference plates 94 and 118 are secured to head 12 of internal combustion engine 10 and the extension 70 is fitted into the bore 56 at the valve end of rocker arm 22. The engine crankshaft (not shown) is manually rotated so that the poppet valves actuated by rocker arm 22 are in the fully closed position where no pressure is applied by the engine camshaft. It should be apparent to those skilled in the art that the measurement of lash for each poppet valve or valves is made under these same conditions. The dial indicator 82 is put into the position indicated by dashed lines 96 and the lever arm 98 positioned so that hook 104 captures the lower portion of portion 48 adjacent slider foot assembly 54. In this position, the lever arm 98 pivots about the fulcrum provided by the larger diameter pin 114 with a mass of reference weights 108 sufficient to take up usual slack within the system. Experimentation has shown that fifteen pounds is appropriate for this purpose, but it should be apparent to those skilled in the art that other values may also be useful for this purpose. When the appropriate weight has been applied, with the extension pin 84 of dial indicator 82 abutting surface 80, the dial indicator 82 is set to zero. The lever arm assembly 98 is removed from the valve end of the push rod 22 and moved to the push rod end of rocker arm 22, as shown in FIG. 4. In this position, hook 104 captures the lower side of portion 32 adjacent the adjustment assembly 36. In this position, the lever assembly 98 then pivots about the smaller diameter fulcrum pin 116 with the reference weight 108 a greater distance from reference plate 118. In this position, the rocker assembly is moved to the opposite extreme of its movement within the articulated valve train. The measurement at the dial indicator assembly 82 reflects the movement of reference surface 80 and therefore the lash in the system. Because the surfaces are fixed geometry and securely fastened to the engine head 12, repeatable and accurate measurements may be determined to verify whether any automated assembly system is in fact maintaining the lash of the articulated valve system within manufacturing tolerances.

When adjacent rocker assemblies are to be measured such as rocker arm 24, the extension pin 70 is removed from rocker arm 22 and positioned on rocker arm 24. The dial indicator assembly 82 is moved to the rightmost position 96 shown in FIG. 3 and the lever arm 98 angled so that it assumes the first position wherein it captures the valve end of rocker arm 24 to enable the zero setting for dial indicator 82. The lever arm 98 is then moved to a second position to pivot rocker arm 24 through its extreme range of movement to generate a differential measurement that is a reflection of the lash of the system.

The benefits of such a system are the expeditious establishment of fixed geometry reference surfaces that enable highly accurate and repeatable measurements of the lash of an articulated valve system, thus avoiding the complex and labor intensive and skill intensive alternative of feeler gauges and similar devices measuring lash. The extension pin 70 enables the use of a readily available and highly accurate dial indicator in an application where it otherwise would be extremely difficult, if not impossible to use the dial indicator and achieve accurate and repeatable measurements of lash.

Having described the preferred embodiment, it will become apparent that various modifications can be made without departing from the scope of the invention as defined in the accompanying claims.

The invention claimed is:

1. Apparatus for measuring the lash in an internal combustion engine articulated valve train having at least one uneven surface adjacent an articulated joint, said apparatus comprising:
   a fixed geometry reference surface positioned on the uneven surface;
   a measuring instrument for indicating the displacement of said fixed geometry reference surface;
   a device for moving the articulated valve train between the extreme limits of movement with a given uniform force in both directions, said measuring instrument indicating the relative displacement of said reference surface to reflect lash in the valve train, and
   a platform adjacent a rocker arm and a weight and fulcrum connected by a arm having a hook, said fulcrum being positioned to pivot on said platform.

2. Apparatus as claimed in claim 1, wherein said moving device urges the rocker arm in pivoting movement in both directions.

3. Apparatus as claimed in claim 1, wherein said fulcrum is positioned on said platform in two selected positions to move said rocker arm in both directions.

4. Apparatus as claimed in claim 1, wherein the articulated valve train has a rocker arm with an uneven surface adjacent said articulated joint.

5. Apparatus as claimed in claim 4, wherein said measuring instrument comprises a dial indicator attached to said internal combustion engine and having a probe abutting said reference surface.

6. Apparatus as claimed in claim 5, wherein said internal combustion engine has ferrous composition and said dial indicator is magnetically attached to said internal combustion engine.

7. Apparatus as claimed in claim 4, wherein said rocker arm has a bore adjacent an articulated joint and said reference surface has a base fitting into said bore and having a substantially flat surface outside of said bore.

8. Apparatus as claimed in claim 7, further comprising a flange extending radially outward and between said base and said reference surface for operator manipulation.

9. Apparatus as claimed in claim 7, wherein said base is spring fit into said bore.

10. Apparatus as claimed in claim 9, wherein said bore has a slot for providing said spring fit.

11. An internal combustion engine articulated valve train comprising:
    at least two mechanical components meeting at an articulated joint, one of said components being a rocker arm articulated with respect to adjacent valve train parts and having at least one irregular surface;
    a device incorporating a fixed geometry reference surface attached to the irregular surface;
    a measuring instrument for indicating the displacement of said fixed geometry reference surface; and
    a device for moving the mechanical components between their range of movements, said measuring instrument indicating the relative displacement relative to reference surface to reflect the lash in the valve train, said moving device comprising a weight, arm, spaced fulcrum and hook and wherein said fulcrum is moveable relative to said rocker arm to urge the rocker arm to the extremes of movement by virtue of the uniform force applied by said weight.

12. An internal combustion engine as claimed in claim 11, wherein said rocker arm has a bore adjacent the articulated valve train component and said reference surface has a base fitting into said bore.

13. An internal combustion engine as claimed in claim 11, wherein said measuring instrument is a dial indicator attached to said internal combustion engine and having a probe abutting said reference surface.

* * * * *